United States Patent
Ashibe et al.

(10) Patent No.: US 7,265,297 B2
(45) Date of Patent: Sep. 4, 2007

(54) MULTIPHASE SUPERCONDUCTING CABLE CONNECTION STRUCTURE AND MULTIPHASE SUPERCONDUCTING CABLE LINE

(75) Inventors: Yuuichi Ashibe, Osaka (JP); Takato Masuda, Osaka (JP); Yoshihisa Takahashi, Tokyo (JP); Kimiyoshi Matsuo, Tokyo (JP); Shoichi Honjo, Tokyo (JP); Tomoo Mimura, Toyo (JP)

(73) Assignees: Sumitomo Electric Industries, Ltd., Osaka (JP); The Tokyo Electric Power Company, Incorporated, Tokyo (JP)

( * ) Notice: Subject to any disclaimer, the term of this patent is extended or adjusted under 35 U.S.C. 154(b) by 16 days.

(21) Appl. No.: 11/014,135

(22) Filed: Dec. 17, 2004

(65) Prior Publication Data

US 2005/0217878 A1 Oct. 6, 2005

(30) Foreign Application Priority Data

Jan. 22, 2004 (JP) ............................. 2004-014928

(51) Int. Cl.
*H01B 12/00* (2006.01)
(52) U.S. Cl. .................. 174/125.1; 174/15.4; 505/230; 505/231; 505/925
(58) Field of Classification Search ............. 174/125.1, 174/15.4, 15.5, 260, 125, 125 L; 257/661–663; 505/230, 231, 704, 925, 926
See application file for complete search history.

(56) References Cited

U.S. PATENT DOCUMENTS

| | | | |
|---|---|---|---|
| 3,808,351 A * | 4/1974 | Moisson-Franckhauser et al. | 174/15.5 |
| 6,049,036 A * | 4/2000 | Metra | 174/15.5 |
| 6,583,351 B1 * | 6/2003 | Artman | 174/15.5 |

FOREIGN PATENT DOCUMENTS

| | | | |
|---|---|---|---|
| EP | 0 780 926 A1 | | 6/1997 |
| JP | 2000-340274 | * | 12/2000 |
| JP | 2000-340274 A | | 12/2000 |

* cited by examiner

*Primary Examiner*—Tuan T. Dinh
*Assistant Examiner*—Yuriy Semenenko
(74) *Attorney, Agent, or Firm*—Foley & Lardner LLP (57) ABSTRACT

A multiphase superconducting cable connection structure includes a connection box accommodating three conductor connects connecting a superconductor of a cable core of each phase extracted from a pair of 3-phase superconducting cables, a solid insulation member fixed to an outer circumference of each conductor connect, and a metal flange fixing the solid insulation member to the connection box. By fixing the metal flange to the connection box (a refrigerant vessel), the conductor connect can be positioned and the conductor connector's movement caused as the cable core thermally contracts can be reduced. The structure can help to position the conductor connect in the connection box and reliably hold it at a prescribed position.

18 Claims, 4 Drawing Sheets

MULTIPHASE SUPERCONDUCTING CABLE CONNECTION STRUCTURE AND MULTIPHASE SUPERCONDUCTING CABLE LINE

BACKGROUND OF THE INVENTION

1. Field of the Invention

The present invention relates generally to structures for connection of a multiphase superconducting cable including a plurality of cable cores having superconductor, and multiphase superconducting cable lines including the structure, and particularly to such structures capable of positionally stabilize a conductor connect in a connection box, and such lines including the structure.

2. Description of the Background Art

Figure 6:
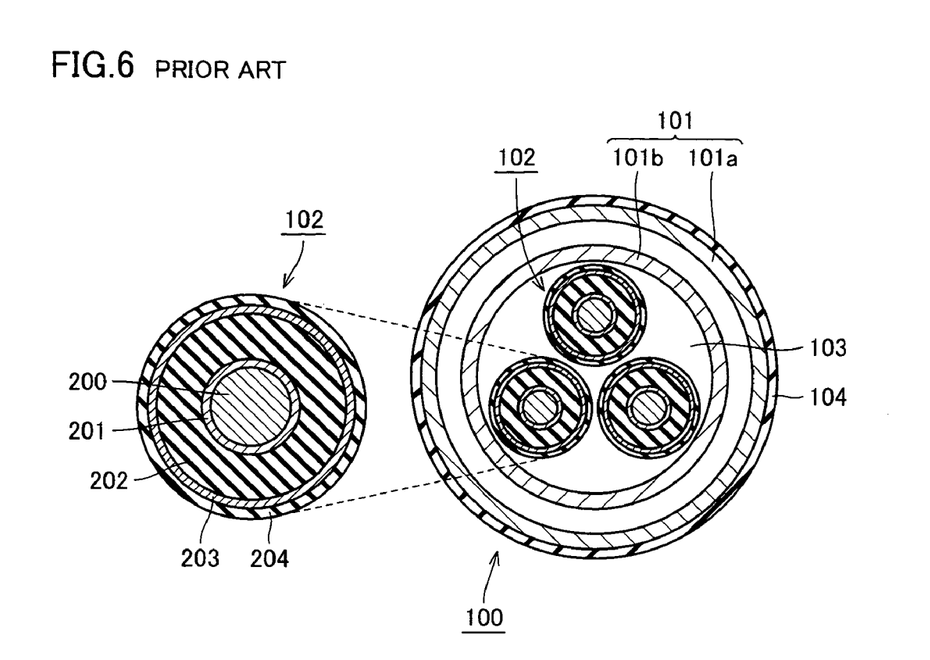
FIG. 6 is a cross section of a 3-phase superconducting cable having three cores assembled collectively.

As one of superconducting cables that have been produced using a superconductor formed of a bismuth (Bi)-based high-temperature superconducting tape for example, not only a single-phase cable including a single cable core but a multiphase superconducting cable of multicore type that is produced by assembling a plurality of cable cores into one unit is also under development. FIG. 6 shows a 3-phase superconducting cable of 3-core type in cross section. With reference to the figure, this superconducting cable 100 includes three cable cores 102 twisted and accommodated in a thermal insulation pipe 101.

Thermal insulation pipe 101 has an outer pipe 101a and an inner pipe 101b. This double pipe constructed of these outer pipe 101a and inner pipe 101b has a thermal insulation material (not shown) provided therein and a vacuum is produced within the double pipe. These cable cores 102 each include, in the order starting from the innermost component, a former 200, a superconductor 201, an electrical insulation layer 202, a shield layer 203, and a protection layer 204. Superconductor 201 is constructed by winding superconducting wires around former 200 in a spiral manner in layers. Electrical insulation layer 202 is formed of wound polypropylene laminated paper. Shield layer 203 is constructed by winding superconducting wires similar to that of superconductor 201 around electrical insulation layer 202 in a spiral manner. In this shield layer 203, in a steady state, current is induced of almost the same magnitude as and opposite in direction to current flowing through superconductor 201. The induced current causes a magnetic field to be generated that cancels out a magnetic field generated from superconductor 201 to achieve almost zero leakage magnetic field outside cable core 102. A space 103 formed between inner pipe 101b and each cable core 102 usually provides a path where a refrigerant flows.

If such a multiphase superconducting cable is used to construct a line over long distance, the line requires an intermediate connection connecting together cable cores extracted from different cables. Such intermediate connection has a structure described for example in Japanese Patent Laying-Open No. 2000-340274 (see FIG. 1). In this structure, superconductors accommodated in a connection box have their respective ends connected in a connection sleeve and a stress cone is attached to the superconductors' ends and the connection sleeve's outer circumference and supported by a rod formed of fiber reinforced plastics (FRP). Furthermore the cable cores in the connection box are supported at a splitter portion of FRP.

For the above described, conventional structure, however, a connection of a superconductor of a cable core in the connection box may for example be positionally moved from a prescribed position, resulting in a disadvantageously variable location for installation.

A superconducting cable is cooled by a refrigerant, as has been described previously. This contracts the cable and accordingly moves the superconductor. As the superconductor moves, in the connection box a portion of each cable core that connects the conductor may each positionally displace as seen lengthwise. Japanese Patent Laying-Open No. 2000-340274 describes a structure providing a connection box accommodating a cable core, a stress cone and the like supported by an FRP member. However, the contractive force exerted as the refrigerant cools the cable is in a significantly large order of several tones, and the FRP member can hardly prevent the movement of the portion that connects the conductor that is associated with thermal contraction. Accordingly, the portion can disadvantageously move from the location for installation.

Furthermore if a cable installed has a condition the portion that connects the conductor is disadvantageously moved toward one side of the connection box or similarly, not positioned in the box, as prescribed. Conventionally there has not been any known effective structure addressing this disadvantage.

SUMMARY OF THE INVENTION

The present invention mainly contemplates a multiphase superconducting cable connection structure that can help to position a portion connecting a conductor in a connection box and maintain it at a prescribed position. The present invention also contemplates a multiphase superconducting cable line including the structure.

The present invention achieves the above objects by connecting a superconductor by a conductor connect each surrounded by a solid insulation member fixed thereto and connected to the connection box by a metal member.

More specifically, the present invention provides a multiphase superconducting cable connection structure including: a pair of multiphase superconducting cables including a plurality of cable cores having a superconductor; a connection box accommodating a plurality of conductor connects connecting a superconductor of a cable core extracted from a different cable; a solid insulation member fixed to an outer circumference of each of the conductor connects; and a metal flange fixing the plurality of solid insulation members to the connection box.

The present invention allows a conductor connect to be surrounded by a solid insulation member fixed to a connection box to fix the conductor connect to the connection box. Furthermore the present invention can positionally fix the conductor connect in the connection box by supporting the solid insulation member by a member formed of metal superior in strength, rather than FRP or similar insulative resin, to effectively prevent positional offset attributed to thermal behavior. Furthermore in the present invention the metal flange can be fixed to the connection box. The conductor connect's position in the connection box can be readily determined, and the excessive unbalance of a location for installation that is introduced in arranging a cable can be prevented.

Preferably in the present multiphase superconducting cable connection structure the connection box has a refrigerant introduced therein to cool the cable core and the metal flange has a flow hole allowing the refrigerant to be communicated therethrough.

Preferably in the present multiphase superconducting cable connection structure the connection box is formed of pieces and thus dividable in a longitudinal direction of the cable core.

Preferably in the present multiphase superconducting cable connection structure the connection box is a cylinder.

Preferably the present multiphase superconducting cable connection structure further includes a shield layer surrounding the superconductor, and a shield connect provided to short circuit shield layers of cable cores, respectively, extracted from one cable.

Preferably in the present multiphase superconducting cable connection structure the shield connect is formed of at least one of normal-conducting material and superconducting material.

Preferably the present multiphase superconducting cable connection structure further includes a shield link connecting together a shield layer of each cable core extracted from one cable and a shield layer of each cable core extracted from the other cable.

Preferably in the present multiphase superconducting cable connection structure the shield link is formed of at least one of normal-conducting material and superconducting material.

The present multiphase superconducting cable line includes the structure as described above.

Hereinafter the present invention will be more specifically described.

The present invention is directed to a multiphase superconducting cable including a plurality of cable cores having superconductor. For example, the present invention is directed to a three-phase superconducting cable correctively having three cable cores twisted and accommodated in a thermal insulation pipe. The superconducting cable may be a known multiphase superconducting cable. A pair of such multiphase superconducting cables are prepared and the superconductor of a cable core extracted from one cable and that of a cable core of the other cable are connected together.

The superconductor is better formed for example of a wire formed of Bi 2223-based superconducting material and wound spirally. It may be provided in either a single layer or multiple layers. If it is provided in multiple layers, an interlayer insulation layer may be introduced. The interlayer insulation layer is formed for example of kraft paper or similar insulation paper or PPLP® or similar insulation paper formed of polypropylene and kraft paper in lamination and wound. The superconductor is surrounded by an electrical insulation layer formed of PPLP® or similar insulation paper formed of polypropylene film and kraft paper in lamination wound therearound. The electrical insulation layer may be surrounded by a shield layer configured to be similar to the superconductor. Such a superconductor is connected by a conductor connect, which is better formed of a superconductor exposed at an end of a cable core and a connection sleeve formed of conductive material and receiving a pair of superconductors therethrough. A solid insulation member, described hereinafter, may be arranged to surround the superconductor and the connection sleeve. At a site of operation, however, it can be difficult to arrange the solid insulation member around the superconductor. Accordingly, the connection sleeve may be adapted to have a size allowing the solid insulation member to be arranged and the connection sleeve may have the solid insulation member arranged to surround the connection sleeve.

The present invention is directed to a multiphase cable including a plurality of cable cores, as described above. As such, there exist more than one conductor connect connecting together a superconductor of a cable core extracted from one cable and that of a cable core extracted from the other cable. In the present invention the plurality of conductor connects are accommodated in a single connection box. More specifically, for example for a 3-phase cable having three cores assembled collectively, the three cores are connected in the single connection box. A multiphase, multicore cable is often formed of a plurality of cable cores twisted together. Furthermore, if multiphase, multicore cables are connected together, they must be connected for each phase. This entails disassembling each cable into single phase and connecting the separated cable cores together. This requires a large space for installing the structure for connection. For example in a manhole or the like, however, a sufficient space may not be ensured for installing a connection box for each phase. Furthermore, if a connection box is formed for each phase, a similar operation will be repeated time and again, and there is a need for improvement in efficiency of assemblage. The present invention achieves reduced space for installation and improved efficiency of assemblage by accommodating a plurality of conductor connects in a single connection box.

The connection box for example includes a dual structure formed of a refrigerant vessel receiving a refrigerant and accommodating conductor connects and an insulation vessel accommodating the refrigerant vessel. It is recommended that the insulation vessel be vacuumed to be thermal insulative. Such a connection box is preferably formed of stainless steel or similar metal excellent in durability. Furthermore, preferably the connection box is in the form of a cylinder as such can contribute to reduced turbulent flow of a compressed refrigerant in the box. Furthermore, the connection box is preferably formed of combined subpieces allowing the box to be dividable in the cable core's longitudinal direction. This can help to perform an operation for connection for example in a manhole or at a similar location having a limited space for installation. More specifically, for example if the connection box is formed of two semipieces dividable in the cable core's longitudinal direction, one piece is moved away toward the root of one cable to be connected (i.e., a side distant from an end to be connected) and the other piece is moved away toward the root of the other core. This allows both cable cores to have their respective ends to be connected exposed to facilitate the operation for connection. Once the superconductors have been connected, the semipieces having been moved away are again moved toward the connected ends and for example welded and thus connected and integrated together to form the connection box.

Furthermore in the present invention, as has been described above, the conductor connect is surrounded by a solid insulation member. If the solid insulation member is arranged to surround a connection sleeve, the solid insulation member may previously be attached for example in a factory to surround the connection sleeve. At the site of installation, the connection sleeve and the superconductor are connected together, so that the conductor connect can be surrounded by the solid insulation member. The solid insulation member may be implemented by a unit formed of epoxy resin or similar insulating resin. It may be implemented by a known stress cone applied to a normal-conducting cable to alleviate electrolysis. To cause the solid insulation member to closely surround the conductor connect, the solid insulation member's contractive force can for example be utilized. Furthermore the solid insulation member preferably has an outer circumference, a vicinity thereof and the like provided with a reinforcement layer implemented by kraft paper, PPLP® or similar insulator to provide reinforced insulation.

The solid insulation member is fixed to the connection box. In particular, the present invention fixes a plurality of solid insulation members to the connection box by employing a metal flange generally excellent in strength. More specifically, the plurality of solid insulation members are fixed and positioned by the metal flange in the connection box at a single location as seen along the cable core. This can effectively reduce each conductor connect's positional offset in the connection box that is caused as the cable cores thermally contract. To fix the solid insulation member to the metal flange, for example the metal flange includes a fixed flange and a clamping flange and the solid insulation member is also provided for example with a protrusion so that the protrusion can be sandwiched by the flanges and they are for example bolted with fixture hardware and thus clamped together.

For example, the metal flange is in the form of a plate adapted to the connection box's geometry, for example a disk if the connection box is in the form of a cylinder, and the metal flange includes a structure provided with a hole for insertion to fix a plurality of solid insulation members. Furthermore, the metal flange may be provided with a flow hole capable of passing a refrigerant therethrough. If the metal flange includes the fixed flange and the clamping flange, the fixed flange may be formed to be adapted to the connection box's geometry, and also provided with the hole for insertion, the flow hole and the like, and the clamping flange may be formed and sized to be capable of clamping the protrusion. The metal flange may be formed of any material of metal having strength capable of holding the conductor connect so that it is not or hardly moved in the core's longitudinal direction despite an order of several tones of force exerted as the cable core thermally contracts. For example, the material includes SUS304, SUS316, SUS317 and similar stainless steel, and JIS standard C4621P (naval copper plate) and the like. The metal flange is connected to the connection box for example by welding, bolting or similarly adjoining with fixture hardware. While there may be provided a plurality of such flanges along the cable core, only a single metal flange may be provided, since too large a number of metal flanges may impair the refrigerant's flowability.

If the metal flange is formed to be adapted to the connection box's geometry, the metal flange can be fixed in the connection box to divide the connection box to provide a plurality of spaces. To help the refrigerant to flow in the connection box a bypass flow path may separately be provided to connect the spaces. It is recommended that the bypass flow path be provided with a valve opened and closed to adjust the refrigerant's flow rate, as appropriate. If the refrigerant is not circulated, a refrigerator may be provided that can cool the refrigerant introduced into each space.

Furthermore, if the cable core includes a shield layer surrounding the superconductor, there may be provided a shield connect short circuiting shield layers of cores, respectively, extracted from one cable. When a superconducting cable has shield layers grounded and connected via the earth, the shield layer, large in connection resistance, passes a current smaller in magnitude than that flowing through the superconductor. As such, each cable core's shield layer cannot create a magnetic field of a level canceling a magnetic field generated from each core's superconductor, and a large magnetic field may disadvantageously be caused external to each core. To prevent this, the shield layers are connected together by a shield connect and thus short-circuited.

The shield connect is formed of conductive material, which may be either normal-conducting material or superconducting material. The superconducting material includes copper, aluminum, both of which provide a specific resistance $\rho$ for 77K equal to $2 \times 10^{-7}$ $\Omega \cdot cm$, or similar metal providing small electrical resistance for around a refrigerant's temperature at which a superconducting cable is used, e.g., the temperature of liquid nitrogen if it is used as a refrigerant. The superconducting material includes a superconducting tape employing a Bi-based oxide superconductor such as Bi2223 phase similar to that used for the superconductor, the shield layer and the like, a superconducting wire such as round wire used to produce the tape, and the like. The superconducting tape, the round wire and the like include those formed for example by the powder in tube process. Well known superconducting tape, round wire and the like may also be used.

The shield connect is simply required to connect at least a portion of shield layers relative to the cable core's longitudinal direction and its geometry includes a geometry that can contact at least a portion of the shield layer of each core as seen circumferentially and also connect the cores' shield layers together. If the shield layer is formed of a plurality of superconducting strands, it preferably has a geometry allowing electrical connection to all of the constituent superconducting strands. For example, it includes a combination of a cylindrical member capable of covering the shield layer's outer circumference, and a link member linking such cylindrical members together. If the link member is a flexible member, e.g., a member formed of braided material, it can follow each core's movement caused as the cable is cooled and thus contracts. Furthermore, as it readily deforms, it is excellent in workability in assemblage in the connection box or similar location having a limited space and can also absorb a dimensional error introduced during operation for assemblage. The cylindrical member and the link member may be formed of identical material or different materials. For example, the cylindrical member may be formed of copper, aluminum or similar normal-conducting material exhibiting excellent workability for attachment, and the link member may be formed of superconducting material, or normal-conducting material and superconducting material used together.

The shield connect and the shield layer are connected preferably by a method accompanied by small electrical resistance attributed to connection. For example, solder, low-point solder in particular, is preferably used. For normal-conducting cables, solder for bonding has a melting point typically of approximately 190° C., which is higher than the heat resistance temperature of an electrical insulation layer underlying the shield layer. If the above solder is used, heat applied to melt the solder may impair the electrical insulation layer's insulation performance. Accordingly, a low-point solder having a melting point of at least 60° C. and at most 120° C. is suitably used. Note that if the shield connect is attached to the shield layer, and the cable core includes a protection layer, the portion of the protection layer for connection is previously removed to expose the shield layer. Furthermore, such a shield connect is only required in the connection box at least at a single location, and may be provided for each cable at a single location for a total of two locations.

If the shield connect is introduced, preferably each cable's extracted cable cores also have their shield layers connected together. More specifically, preferably a shield link is introduced to connect a shield layer of each cable core extracted from one cable and a shield layer of each cable core extracted from the other cable. The shield link is formed of conductive material, which may be either normal-conducting material or superconducting material. The normal-conducting material and the superconducting material include those similar to the shield connect. Furthermore, the shield link and the shield layer are connected by soldering, crimping and the like.

In the connection box each cable core is better held by a holding tool. The holding tool includes that which can hold each cable core and also space the cores to facilitate an operation conducted to connect the superconductor. Furthermore the holding tool may be fixed to the connection box or movable in the connection box as the cable core expands/contracts. The movable holding tool is preferable as it can contribute to alleviated force exerted to the metal flange in thermal contraction. Preferably, at least one such holding tool is arranged along the cable core.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in an embodiment will be described.

Figure 1:
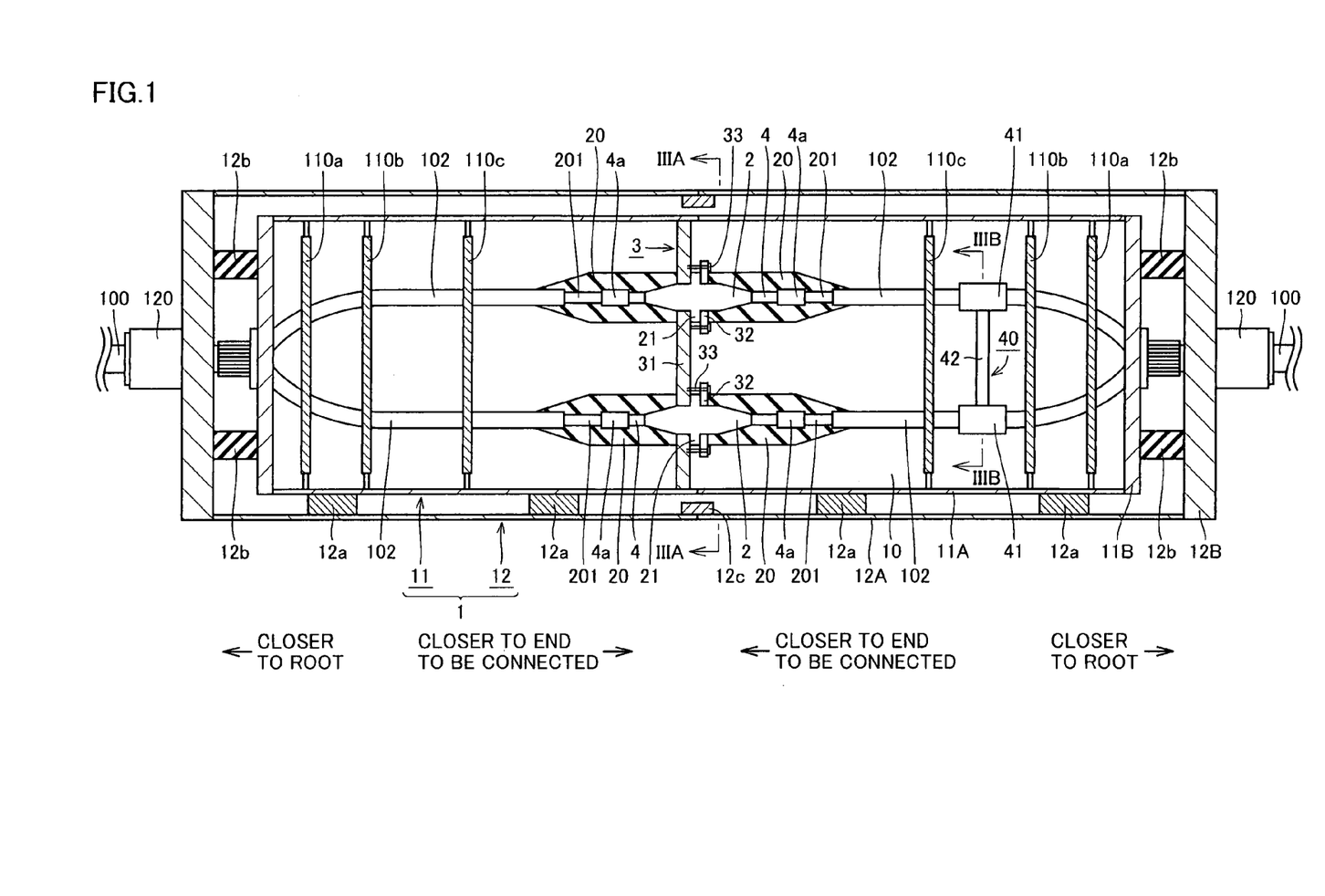
FIG. 1 schematically shows a configuration of the present superconducting cable connection structure.
Figure 3A:
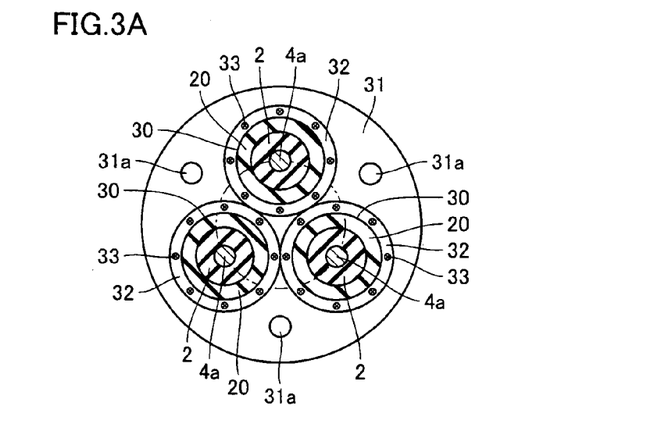
FIG. 3A is a cross section taken along a line IIIA-IIIA of FIG. 1 showing a solid insulation member and a metal flange connected together.

FIG. 1 shows an intermediate connection structure for a multiphase superconducting cable including a plurality of cable cores 102 having superconductor. In the present embodiment it shows a 3-phase superconducting cable 100 having three cable cores 102 assembled in one unit. While FIG. 1 is a side view and accordingly shows only two cores, as seen in a direction of a plane, as shown in FIG. 3A described later, three cable cores can be seen.

This connection structure includes a connection box 1 accommodating three conductor connects connecting a superconductor 201 of a cable core 102 of each phase extracted from a pair of 3-phase superconducting cables 100, a solid insulation member 2 fixed to each conductor connects' circumference, and a metal flange 3 allowing solid insulation member 2 to be fixed to connection box 1.

—Superconducting Cable—
<Structure of Cable>

Three-phase superconducting cable 100 of this embodiment has the same structure as that shown in FIG. 6. Specifically, with reference to the figure, three-phase superconducting cable 100 is structured by twisting three cable cores 102 and housing them in thermal insulation pipe 101, the cable cores each including, in the order starting from the innermost component, former 200, superconductor 201, electrical insulation layer 202, shield layer 203 and protection layer 204. Former 200 is constructed by twisting a plurality of copper wires each coated with an insulator. Superconductor 201 is constructed by winding in spiral manner Bi2223-based superconducting tape-shaped wires (Ag—Mn sheath wires) in layers around former 200. Shield layer 203 is constructed by winding in spiral manner Bi2223-based superconducting tape-shaped wires (Ag—Mn sheath wires) in layers around electrical insulation layer 202. Electrical insulation layer 202 is constructed by winding polypropylene laminated paper (PPLP® manufactured by Sumitomo Electric Industries, Ltd.) around superconductor 201. Protection layer 204 is constructed by winding kraft paper around shield layer 203. Thermal insulation pipe 101 has outer pipe 101a and inner pipe 101b each formed of an SUS (stainless steel: JIS) corrugated pipe. The double pipe constituted of outer pipe 101a and inner pipe 101b has a thermal insulation material therein provided in layers and a vacuum is produced within the double pipe to accomplish a vacuum multilayer thermal insulation structure. Between inner pipe 101b and each cable core 102, liquid nitrogen or similar refrigerant is communicated. Further, anticorrosion layer 104 of polyvinyl chloride is provided around thermal insulation pipe 101.

<Holding Tool>

Superconducting cable 100 is twisted together and thus accommodated in insulation pipe 101 and at an end introduced into connection box has each cable core 102 mutually spaced increasingly as seen from the cable's root toward the cable's end to be connected, and thus split and accommodated in connection box 1 so that the cable cores can be separately, readily handled. In the present embodiment, for each cable 100, as seen along cable core 102 or in the lateral direction in FIG. 1, a first holding tool 110a is arranged closer to the cable's root, a third holding tool 110c closer to the cable's end to be connected, and a second holding tool 110b intermediate therebetween. Between the first and second holding tools 110a and 110b a semi-circular, arcuate member (not shown) is arranged to hold cable core 102 and also link holding tools 110a and 110b together. The third holding tool 110c is not linked with the other holding tools 110a or 110b. The first holding tool 110a has an annular portion located at the center and surrounded by three semi-circular, arcuate members fixed thereto. The annular portion is arranged between three cable cores 102 so that the annular portion has the center positioned substantially at the center of the space surrounded by cores 102 and the first holding tool 110a holds cores 102 such that they are spaced. The second and third holding tools 110b and 110c have a basic structure substantially the same as the first holding tool 110a, although different only in that the annular portion has a diameter larger than first holding tool 110a. Furthermore tools 110a-110c have a sliding portion (not shown) substantially in point contact with an inner peripheral surface of box 1 so as to be movable in box 1 as cable cores 102 expand/contract. The sliding portion is attached to an outer peripheral portion of the annular portion that does not have a semi-circular, arcuate member fixed thereto. While in the present embodiment holding tools 110*a*-110*c* are adapted to be movable in the connection box, they may by fixed in the box.

—Connection Box—

Superconducting cables 100 have their respective ends introduced into connection box 1 and connected together. Connection box 1 has a dual structure formed of a refrigerant vessel 11 receiving a refrigerant 10 and having the conductor connect accommodated therein and an insulation vessel 12 accommodating refrigerant vessel 11. In the present embodiment vessels 11 and 12 are formed dividably in the longitudinal direction of cable core 102. More specifically, the vessels are formed of semipieces combined and thus integrated together. For example if connection box 1, having a length of approximately four meters, is installed in a manhole, which typically has a length of approximately 5 to 6 meters×a depth of approximately 5 to 6 meters×and a height of approximately 2 meters, and connection box 1 has an undividable structure, then it is difficult to introduce the connection box into the manhole. Furthermore, it is also difficult to conduct an operation for connection in the manhole. Furthermore, while preferably the conductor connect should be arranged in the connection box close to the center, moving the one-piece connection box toward the root of one cable 100 to connect the superconductor requires a large margin for moving the connection box away. Furthermore, the conductor connect is formed at a location opposite to the moved box, and thereafter when the box is again moved toward the conductor connect, the conductor connect may be arranged in the box offset toward one side thereof (i.e., the location of the operation for connection). In contrast, if the connection box is formed of semipieces and thus dividable in the cable core 102 longitudinal direction, the pieces can be approximately two meters, which can help to introduce the box into the manhole and also does not require large margin. Furthermore, the semipieces moved away to the roots of two cables 100 to be connected, respectively, allows a formed conductor connect to be readily arranged in connection box 1 in the vicinity of the center. Furthermore in the present embodiment connection box 1 is formed in a cylinder to reduce pressure loss attributed to communication of compressed refrigerant.

<Refrigerant Vessel>

Refrigerant vessel 11 receives liquid nitrogen or similar refrigerant. In the present embodiment refrigerant vessel 11 is formed of stainless steel. Refrigerant vessel 11 is formed of semipieces each including a tube member 11*a* having opposite ends opened and an end surface plate 11B attached to one end of tube member 11A. Tube member 11A has one end with end surface plate 11B attached thereto and the other, open end connected to that of another tube member 11A to form a closed space as shown in FIG. 1. Tube members 11A are connected for example by welding.

<Insulation Vessel>

Insulation vessel 12 accommodates refrigerant vessel 11. In the present embodiment insulation vessel 12 is formed of stainless steel. Furthermore in the present embodiment refrigerant vessel 11 and insulation vessel 12 form a space therebetween, which is vacuumed for thermal insulation. Insulation vessel 12 is formed of semipieces each including a tube member 12*a* having opposite ends opened and an end surface plate 12B attached to one end of tube member 12A. Tube member 12A has one end with end surface plate 12B attached thereto and the other, open end connected to that of another tube member 12A to form a closed space as shown in FIG. 1. Tube members 12A are connected for example by welding. In the present embodiment, to help to connect tube member 12A, tube member 12A has an inner circumferential surface with a ring member 12C arranged thereon. Furthermore in insulation vessel 12 a supporting jig 12*a* is arranged to support the refrigerant vessel 11 self weight and a fixture 12*b* is arranged to positionally fix refrigerant vessel 11 in vessel 12 as seen lengthwise. Supporting jig 12*a* is formed of stainless steel excellent in strength and has an accurate geometry extending along an outer circumference of tube member 11A of refrigerant vessel 11 and an inner circumference of tube member 12A of insulation vessel 12. Fixture 12*b* is formed of less thermally conductive FRP in a ring sized to be capable of abutting against end surface plate 11B of refrigerant vessel 11.

—Conductor Connect—

Figure 2:
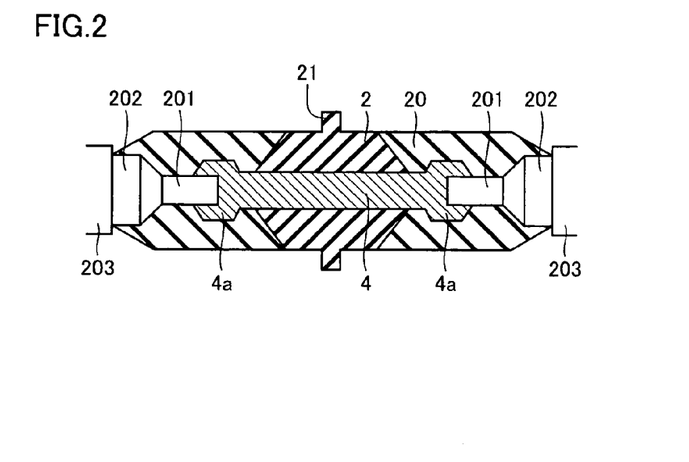
FIG. 2 is a general, schematic diagram for illustrating a structure of a conductor connect in the present structure.

With reference to FIG. 2 the present embodiment provides a conductor connect formed of an end of superconductor 201 exposed from a cable core of each phase, and a connection sleeve 4 receiving and passing the conductor 201 end therethrough. In the present invention the conductor connect has an outer circumference surrounded by a solid insulation member 2. In the present embodiment, in particular, connection sleeve 4 has an outer circumference surrounded by solid insulation member 2. Connection sleeve 4 is a member in the form of a rod formed of conductive material, and having opposite ends provided with a connect 4*a* receiving superconductor 201, and a center sized to allow solid insulation member 2 to be arranged therein. In the present embodiment the connection sleeve is formed of copper. Alternatively, it may be formed of aluminum or the like. Furthermore, connection sleeve 4 may be provided with solid insulation member 2 for example in a factory and connection sleeve 4 and superconductor 201 may be connected together inside a manhole or at a similar site where the connection structure is actually formed.

—Solid Insulation Member—

In the present embodiment solid insulation member 2 is implemented by a stress cone formed of epoxy resin. By the stress cone's contractive force, solid insulation member 2 coheres closely to an outer circumference of connection sleeve 4. The stress cone is one piece and has opposite ends tapered. To help to fix it to a metal flange 3 described hereinafter, the stress cone has a circumferential ring protrusion 21 used for fixture to flange 3 (a fixed flange 31) by fixture hardware 33. In the present embodiment protrusion 21 is formed integral to solid insulation member 2.

—Reinforcement Layer—

The conductor connect (i.e., an end of electrical insulation layer 202, an end of superconductor 201, and an end of connection sleeve 4) has an outer circumference surrounded by a reinforcement layer 20 as shown in FIGS. 1 and 2 to reinforce insulation. In the present embodiment reinforcement layer 20 is formed of kraft paper wound around the conductor connect.

—Metal Flange—

Solid insulation member 2 is fixed to connection box 1 (refrigerant vessel 11) via metal flange 3. In the present embodiment metal flange 3 includes a fixed flange 31 receiving and passing three solid insulation members 2 therethrough, and a clamping flange 32 clamping protrusion 21 of solid insulation member 2. In the present embodiment flanges 31 and 32 are formed of stainless steel (SUS 304) excellent in strength.

In the present embodiment flange 31 is formed in a disk adapted to the geometry of the connection box (the refrigerant vessel), as shown in FIG. 3A, and includes a hole 30 allowing the flange to receive and pass solid insulation member 2 therethrough. In the present embodiment three holes 30 are provided in a triangle. Furthermore, as flange 31 divides the refrigerant vessel into two, right and left spaces (see FIG. 1), flange 31 shown in the present embodiment is accordingly provided with a plurality of flow holes 31a, as shown in FIG. 3A, to help the refrigerant to communicate between the two spaces. This allows the refrigerant vessel to have liquid nitrogen or similar refrigerant communicating therein more smoothly. Flange 32 is a ring member sized to be capable of cooperating with flange 31 to sandwich the solid insulation member 2 protrusion 21 therebetween (see FIGS. 1 and 2). Such flanges 31 and 32 sandwich the solid insulation member 2 protrusion 21 and a bolt or similar fixture member 33 is used to clamp flanges 31 and 32 to fix solid insulation member 2 to metal flange 3. Note that FIG. 3A does not show the reinforcement layer.

Metal flange 3 with solid insulation member 2 inserted therethrough and thus fixed is then fixed to connection box 1 (refrigerant vessel 11). In the present embodiment the flange is welded and thus fixed to connection box 1. This fixes the conductor connect's position in connection box 1 (refrigerant vessel 11). In particular, in the present invention, solid insulation members 2 arranged for a plurality of cable cores 102 are fixed to a single metal flange 3, and the conductor connects are not positionally offset from each other. Furthermore, flange 3 formed of metal excellent in strength can prevent the conductor connect from significantly moving in the longitudinal direction of core 102 when the refrigerant cools and as a result contracts cable core 102. Furthermore, by the flange 3 fixture, the superconductor's position in connection box 1 can be determined. This can prevent an offset introduced in installing a cable. The present invention can thus hold the conductor connect at a desired position (e.g., a designed position).

—Processing the Shield Layer—

Furthermore in the present embodiment cable cores 102 extracted from each superconducting cable 100 have their respective shield layers connected by a shield connect 40 and thus short circuited. It is difficult to generate leakage flux outside of each cable core 100.

Figure 3B:
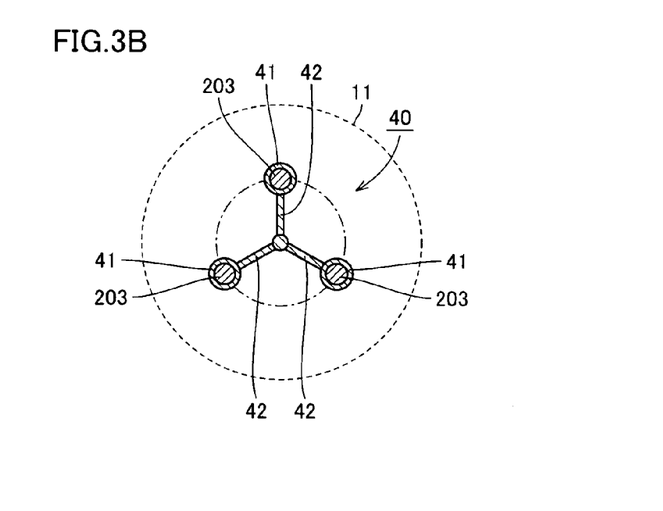
FIG. 3B is a cross section taken along a line IIIB-IIIB of FIG. 1 showing a structure of a shield connect short circuiting shield layers.

In the present embodiment shield connect 40 is a combination of a cylindrical member 41 surrounding shield layer 203 and a link member 42 linking such cylindrical members 41 together, as shown in FIG. 3B. In the present embodiment shield connect 40 is formed of copper. In particular, link member 42 is implemented by flexible braided material to help to connect cylindrical member 41 and link member 42 together within connection box 1 or a similarly limited space and also absorb dimensional offset introduced in operation for assembly. Furthermore in the present embodiment shield layer 203 and cylindrical member 41 are connected with low melting solder. More specifically, they are connected with a solder having a melting point of approximately 78° C., and having a chemical composition of 9.3% by mass of Sn, 34.5% by mass of Pb, 50% by mass of Bi, and 6.2% by mass of Cd.

In the present embodiment the shield connect is formed of normal-conducting material. Alternatively, it may be formed of superconducting material. For example, the cylindrical member may be formed of copper, as described above, and the link member may be formed of superconducting material. More specifically, a plurality of round wires formed by the powder in tube process may be used to connect cylindrical members together. Furthermore in the present embodiment the shield connect is provided in connection box 1 at a single location. Alternatively, it may be provided for each cable at a single location for a total of two locations, or it may be dispensed with.

Figure 4:
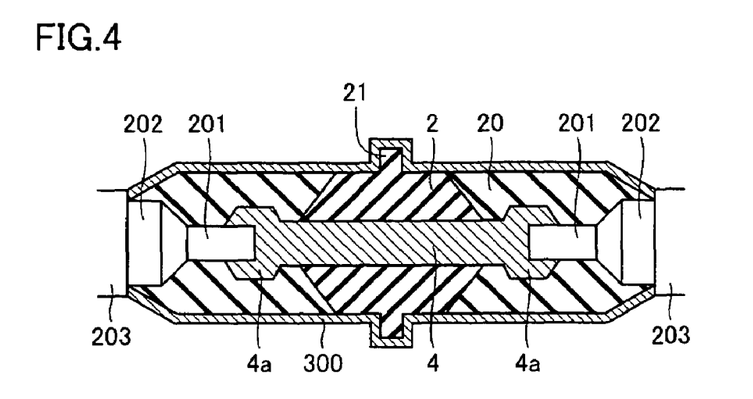
FIG. 4 is a general, schematic diagram showing a configuration of the present structure including a shield link.

If the shield connect is provided, then as shown in FIG. 4, a shield link 300 is preferably provided to connect one cable's shield layer 203 and the other cable's shield layer 203 together. In the present embodiment shield link 300 is formed of braided material of copper and it is arranged to extend from one cable's shield layer 203 along shield layer 203 and the first insulation material 2 to the other cable's shield layer 203 and connected to each shield layer 203 with solder. In the present embodiment the shield link is formed of normal-conducting material. Alternatively, it may be formed of superconducting material or crimped and thus connected.

—Bypass Flow Path—

Figure 5:
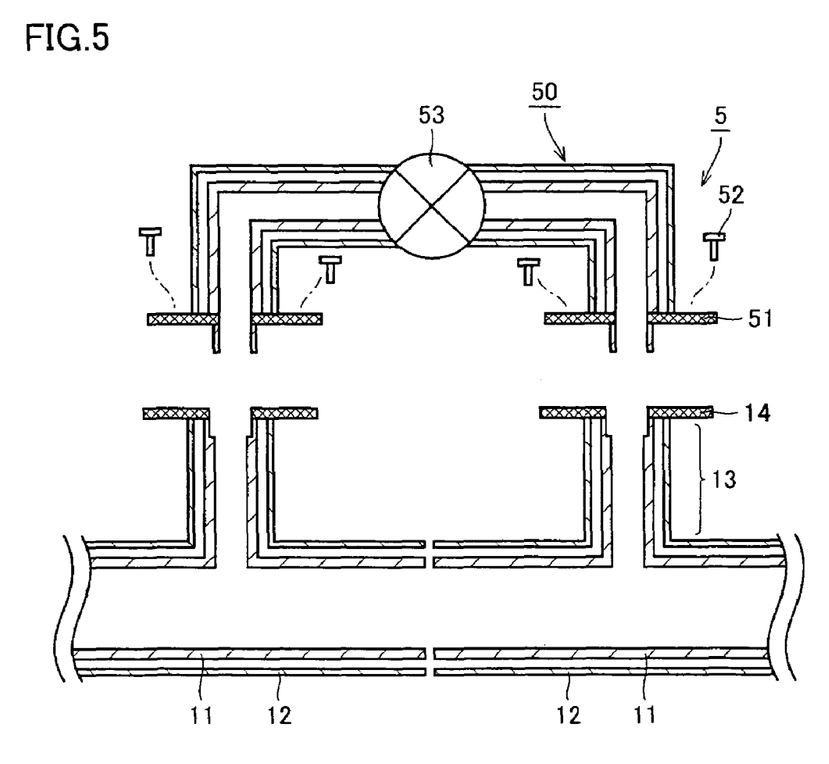
FIG. 5 is a schematic, enlarged view showing a structure of a bypass flow path of the present structure including the bypass flow path by way of example.

In the present embodiment metal flange 3 (fixed flange 31) is provided with flow hole 31 a for communicating a refrigerant. Alternatively, as shown in FIG. 5, a bypass flow path 5 may be provided to connect two subspaces formed in refrigerant vessel 11 divided by flange 3. Bypass flow path 5 is for example a tube in the form of a tube having a thermal insulation structure similar to that of connection box 1. More specifically, as shown in FIG. 5, it includes using a pipe 50 in the form of a horse shoe as seen in cross section having a dual structure formed of a refrigerant vessel and an insulation vessel. Furthermore, pipe 50 has opposite ends each having an opening provided with a flange 51, and refrigerant vessel 11 and insulation vessel 12 each have a cylindrical member provided with a connection pipe 13 connectable to pipe 50 and connection pipe 13 has an opening provided with a flange 14 to which flange 51 is adjoined. Flange 51 of bypass flow path 5 and flange 14 associated with connection box 1 are adjoined and for example bolted with clamping hardware 52 for fixture. Furthermore, it is recommended that bypass flow path 5 be provided with a valve 53 opened and closed to adjust the refrigerant's flow rate. It is preferable that refrigerant vessel 11 has the connection pipe 13 portion with an intermediate portion having a detachably attachable configuration, e.g., a connector attached thereto, as such can help to arrange it in insulation vessel 12. Furthermore, it is preferable that the intermediate portion be a flexible tube, as it allows improved insertability.

—Procedure of Assemblage—

The above described intermediate connection structure is better assembled in the following procedure (see FIG. 1): a pair of superconducting cables 100 to be connected have their respective ends with their insulation pipes cut and thus removed to expose cable core 102 which is in turn passed through a tube connect 120 connecting the thermal insulation tube and connection box 1 together, the insulation vessel 12 end surface plate 12B, cylindrical member 12A and fixture 12b, and the refrigerant vessel 11 end surface plate 11B and cylindrical member. 11A sequentially. They are further moved toward the root of each cable 100. Each cable 100 has cable core 102 with an end to be connected exposed. Note that if the superconducting cable is taken into the connection box with its vacuum structure maintained, the cable may have an end without the thermal insulation pipe cut or removed.

In that condition, holding tools 110a-110c are arranged so that both superconducting cables 100 each have its respective cable cores 102 spaced increasingly toward the end to be connected. Furthermore, one superconducting cable 100 (in FIG. 1, the left cable) has cable core 102 passed through flange 31, and the flange is moved toward the root of the cable (in FIG. 1, the left hand). If the shield layer is processed, a protection layer located in cable core 102 at a location remote from the conductor connect is removed to expose the shield layer and shield connect 40 is attached thereto.

Both superconducting cables 100 have each cable core 102 having an end with superconductor 201 exposed. The other cable (in FIG. 1, the right cable) has superconductor 201 passed through flange 32. Connection sleeve 4 has an outer circumference previously provided with solid insulation member 2 attached thereto, and flanges 31 and 32 having been moved away are moved to sandwich the solid insulation member 2 protrusion 21 and they are clamped with fixture hardware 33 to fix solid insulation member 2 to metal flange 3. Then flange 3 is positioned relative to connection box 1 (refrigerant vessel 11) and welded and thus fixed to connection box 1 and thereafter cable core 102 of the same phase has superconductor 201 inserted through the connection sleeve 4 each connect 4a, and crimped and thus connected. In doing so, superconductor 201 is adjusted in length to position solid insulation member 2, as described. Such an operation for connection is performed for each phase. This operation provides a structure providing the conductor connect at an outer circumference thereof with a solid insulation member. Furthermore metal flange 3 fixed to connection box 1 can help to position the conductor connect. Subsequently, solid insulation member 2 is surrounded by reinforcement layer 20, as appropriate. If shield connect 40 is provided, it is preferable that a shield link (see FIG. 4) be provided to connect one cable core 102 shield layer and the other cable core 102 shield layer. Then refrigerant vessel 11 has cylindrical members 11A, having been moved away toward their respective cables' roots, moved toward the cables' ends to be connected, respectively, and welded and thus connected together. Thus the conductor connect is fixed to refrigerant vessel 11 via solid insulation member 2 and metal flange 3.

Refrigerant vessel 11 has end surface plate 11B each welded and thus connected, and insulation vessel 12 including fixture 12b and supporting jig 12a has cylindrical member 12A moved toward the end to be connected, and welded and thus connected to the counterpart cylindrical member 12A. Then, insulation vessel 12 has end surface plate 12B each welded and thus connected to cylindrical member 12A, and furthermore, cylindrical member 12A has tube connect 120 each welded and thus connected thereto. This provides an integral, intermediate connection structure. Then refrigerant vessel 11 and insulation vessel 12 has a space therebetween vacuumed and thereafter refrigerant vessel 11 receives a compressed refrigerant to allow a superconducting cable line to be used.

The connection box thus divided in the longitudinal direction of a cable core can facilitate assemblage in a manhole or a similarly limited space.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiphase superconducting cable connection structure comprising:
    a pair of multiphase superconducting cables each including a plurality of cable cores that each have a superconductor;
    a connection box accommodating a plurality of conductor connects, each of the plurality of conductor connects connecting a superconductor of a corresponding cable core of the plurality of cable cores of one of the pair of multiphase superconducting cables to a superconductor of a corresponding cable core of the plurality of cable cores of another one of the pair of multiphase superconducting cables;
    a plurality of solid insulation members, each solid insulation member of the plurality of solid insulation members fixed to an outer circumference of a corresponding conductor connect of said plurality of conductor connects; and
    a metal flange fixing the plurality of solid insulation members to said connection box;
    wherein each cable core of the plurality of cable cores of the one of the pair of multiphase superconducting cables includes a shield layer surrounding said superconductor of the cable core;
    wherein the multiphase superconducting cable connection structure further includes a shield connect provided to short circuit shield layers of at least two cable cores of the plurality of cable cores of the one of the pair of multiphase superconducting cables; and
    wherein the shield connect is formed of an element different from said shield layers of said at least two cable cores.

2. The multiphase superconducting cable connection structure according to claim 1,
    wherein said connection box has a refrigerant introduced therein; and
    wherein said metal flange has a flow hole allowing refrigerant to be communicated therethrough.

3. The multiphase superconducting cable connection structure according to claim 1, wherein said connection box is formed of pieces and thus dividable in a longitudinal direction of a cable core of the plurality of cable cores of the one of the pair of multiphase superconducting cables.

4. The multiphase superconducting cable connection structure according to claim 1, wherein said connection box is a cylinder.

5. The multiphase superconducting cable connection structure according to claim 1, wherein said shield connect is formed of at least one of normal-conducting material and superconducting material.

6. The multiphase superconducting cable connection structure according to claim 1, further comprising a shield link connecting together a shield layer of a cable core of the plurality of cable cores of the one of the pair of multiphase superconducting cables and a shield layer of a cable core of the plurality of cable cores of the another one of the pair of multiphase superconducting cables.

7. The multiphase superconducting cable connection structure according to claim 6, wherein said shield link is formed of at least one of normal-conducting material and superconducting material.

8. The multiphase superconducting cable connection structure according to claim 1,
    wherein the metal flange has a first surface and a second surface opposite the first surface; and
    wherein, when a refrigerant is filled into the connection box, the first surface and the second surface of the metal flange are in contact with the refrigerant.

9. The multiphase superconducting cable connection structure according to claim 1,
    wherein the metal flange has a first surface and a second surface that face opposite directions;
    wherein there is no gap between the first surface and the second surface of the metal flange; and wherein, when a refrigerant is filled into the connection box, the first surface and the second surface of the metal flange are in contact with the refrigerant.

10. A multiphase superconducting cable line comprising:

a multiphase superconducting cable connection structure, the multiphase superconducting cable connection structure comprising:

a pair of multiphase superconducting cables each including a plurality of cable cores that each have a superconductor;

a connection box accommodating a plurality of conductor connects, each of the plurality of conductor connects connecting a superconductor of a corresponding cable core of the plurality of cable cores of one of the pair of multiphase superconducting cables to a superconductor of a corresponding cable core of the plurality of cable cores of another one of the pair of multiphase superconducting cables;

a plurality of solid insulation members, each solid insulation member of the plurality of solid insulation members fixed to an outer circumference of a corresponding conductor connect of said plurality of conductor connects; and a metal flange fixing the plurality of solid insulation members to said connection box;

wherein each cable core of the plurality of cable cores of the one of the pair of multiphase superconducting cables includes a shield layer surrounding said superconductor of the cable core;

wherein the multiphase superconducting cable connection structure further includes a shield connect provided to short circuit shield layers of at least two cable cores of the plurality of cable cores of the one of the pair of multiphase superconducting cables; and wherein the shield connect is formed of an element different from said shield layers of said at least two cable cores.

11. A multiphase superconducting cable connection structure, comprising:

a first multiphase superconducting cable having a plurality of cable cores, each of the plurality of cable cores of the first multiphase superconducting cable having a superconductor;

a second multiphase superconducting cable having a plurality of cable cores, each of the plurality of cable cores of the second multiphase superconducting cable having a superconductor;

a plurality of connection sleeves, each connection sleeve of the plurality of connection sleeves connecting an end of a superconductor of a corresponding cable core of the plurality of cable cores of the first multiphase superconducting cable to an end of a superconductor of a corresponding cable core of the plurality of cable cores of the second multiphase superconducting cable;

a plurality of solid insulation members, each solid insulation member of the plurality of solid insulation members fixed to an outer circumference of a corresponding connection sleeve of the plurality of connection sleeves;

a connection box accommodating the plurality of solid insulation members; and a metal flange fixing the plurality of solid insulation members to the connection box;

wherein each cable core of the plurality of cable cores of the first multiphase superconducting cable further includes a shield layer surrounding the superconductor of the cable core;

wherein the multiphase superconducting cable connection structure further comprises a shield connect connected to at least two cable cores of the plurality of cable cores of the first multiphase superconducting cable, the shield connect short circuiting the shield layers of the at least two cable cores; and wherein the shield connect is formed of an element different from said shield layers of said at least two cable cores.

12. The multiphase superconducting cable connection structure of claim 11, wherein the connection box is formed of four or more pieces connected in a longitudinal direction of the first multiphase superconducting cable.

13. The multiphase superconducting cable connection structure of claim 11, wherein each cable core of the plurality of cable cores of the second multiphase superconducting cable further includes a shield layer surrounding the superconductor of the cable core; and wherein the multiphase superconducting cable connection structure further comprises a plurality of shield links, each shield link of the plurality of shield links connecting a shield layer of a corresponding cable core of the plurality of cable cores of the first multiphase superconducting cable to a shield layer of a corresponding cable core of the plurality of cable cores of the second multiphase superconducting cable.

14. The multiphase superconducting cable connection structure of claim 11, wherein the shield connect is formed of a normal-conducting material.

15. The multiphase superconducting cable connection structure of claim 11, wherein said shield connect comprises:

a first cylindrical member covering an outer circumference of a first shield layer of said shield layers of said at least two cable cores;

a second cylindrical member covering an outer circumference of a second shield layer of said shield layers of said at least two cable cores; and a link member linking the first cylindrical member to the second cylindrical member.

16. The multiphase superconducting cable connection structure of claim 15, wherein the link member is flexible.

17. The multiphase superconducting cable connection structure of claim 15, wherein the link member is formed of braided material that is able to follow a movement of the at least two cable cores when the at least two cable cores are cooled and contract.

18. The multiphase superconducting cable connection structure of claim 15, wherein the first cylindrical member is formed of a normal-conducting material;

wherein the second cylindrical member is formed of a normal-conducting material; and wherein the link member is formed of a superconducting material.

* * * * *